United States Patent
Kroos et al.

(10) Patent No.: US 6,931,145 B1
(45) Date of Patent: Aug. 16, 2005

(54) METHOD AND APPARATUS FOR MEASURING MOTION OF AN OBJECT SURFACE BY MULTI-RESOLUTION ANALYSIS USING A MESH MODEL

(75) Inventors: Christian Kroos, Kyoto (JP); Eric Vatikiotis-Bateson, Kyoto (JP); Takaaki Kuratate, Kyoto (JP)

(73) Assignee: Advanced Telecommunications Research Institute International, Kyoto (JP)

( * ) Notice: Subject to any disclaimer, the term of this patent is extended or adjusted under 35 U.S.C. 154(b) by 599 days.

(21) Appl. No.: 09/712,250

(22) Filed: Nov. 15, 2000

(30) Foreign Application Priority Data

Nov. 16, 1999 (JP) ................................. 11-325362

(51) Int. Cl.$^7$ ............................. G06K 9/00; G06K 9/46
(52) U.S. Cl. ..................................... 382/107; 382/240
(58) Field of Search ........................ 382/117–118, 240, 382/107; 345/853, 723

(56) References Cited

U.S. PATENT DOCUMENTS

| | | | | |
|---|---|---|---|---|
| 5,226,175 A | * | 7/1993 | Deutsch et al. | 345/419 |
| 5,592,228 A | * | 1/1997 | Dachiku et al. | 348/416.1 |
| 5,995,095 A | * | 11/1999 | Ratakonda | 715/500.1 |
| 6,526,215 B2 | * | 2/2003 | Hirai et al. | 386/52 |
| 6,553,071 B1 | * | 4/2003 | Kim et al. | 375/240.19 |

OTHER PUBLICATIONS

Wang et al., "Active Mesh—A Feature Seeking and Tracking Image Sequence Representation Scheme," 1994, IEEE, pp. 610-624.*

* cited by examiner

Primary Examiner—Brian Werner
Assistant Examiner—Shefali Patel
(74) Attorney, Agent, or Firm—McDermott Will & Emery LLP

(57) ABSTRACT

The method of measuring surface motion is for measuring motion of each portion of an object surface from a sequence of unit images of the object including first and second unit images, and includes the step of determining a plurality of measurement points in the image of the object of the first unit image. The plurality of measurement points have a hierarchical structure of a plurality of levels, with the upper level layer having larger number of measurement points than the lower level layer. The method further includes the step of determining points in the image of the object of the second unit image, corresponding to the measurement points of the first unit image of the lowest level among the plurality of levels of the hierarchical structure, and the step of repeating, starting from the level immediately above the lowest level up to the highest level, based on the points corresponding to the measurement points of the first unit image in the level immediately lower than the present level in the image of the object of the second unit image, points corresponding to the measurement points of the first unit image in the image of the object of the second unit image for each level.

16 Claims, 13 Drawing Sheets

METHOD AND APPARATUS FOR MEASURING MOTION OF AN OBJECT SURFACE BY MULTI-RESOLUTION ANALYSIS USING A MESH MODEL

BACKGROUND OF THE INVENTION

1. Field of the Invention

The present invention relates to a process of measuring the motion of a deformable object's surface and, more particularly, the present invention relates to a field of image recognition for measuring, in real time, facial shape from images obtained by a video camera, for example.

2. Description of the Background Art

Human facial expression is extremely important in the communicative interactions of humans. Similarly, human facial expression is important in the so called man-machine interface.

During face-to-face interaction, face motion conveys information at various levels. The transmitted information includes a person's emotional condition, position in a discourse, and while speaking, phonetic details about the speech sounds being produced.

Though various attempts have been made to analyze face motions from sequences of video images, most attempts either have not been based on quantitative evaluation or they have been restricted to limited quantitative evaluation of facial features, pre-determined by some combination of statistical and artistic techniques. Though such techniques can provide useful results, they often rely heavily on artistic rather than empirical techniques, they require tedious frame-by-frame examination, and they have not provided sufficiently accurate measures of face motion to be useful in coding dynamic attributes/properties of the face during, for example, spoken communication.

On the other hand, precise measures of three-dimensional locations of various portions of the face can be made using systems that track markers placed directly on the face surface. Such systems, however, have the following disadvantages.

(1) The equipment necessary for measurement is not general purpose but is highly specialized, thus limiting the scope and utility of applications. Further, the markers must be placed directly on the face, which is invasive for the subject. Therefore, use of such systems requires cooperation of the subject. A third limitation is that these systems cannot be used outside the laboratory environment.

(2) Since only a limited number of markers can be placed on the face, decisions about optimal placement of the markers to attain most effective and exact measurements must be made a priori. To date, however, it has not been possible to optimize the placement of the markers.

Another approach for measuring the motion of a person's face is to extract information quantitatively representing the face motion from sequences of video images. Video image recording requires only a video camera and recorder. Therefore, it is not physically invasive and can be used anywhere, thus overcoming the restrictions of marker-based measurement systems.

The approach using video images, however, involves difficulties such as the image distortion arising from conversion of the three-dimensional information to the two-dimensional information at the time of image pickup, the problem of poor spatial resolution and non-linear lighting effects. These problems are not limited to measurement of human facial expression; they apply to quantitative measurement of the surface motion of any three-dimensional object—animate or inanimate, rigid or non-rigid.

SUMMARY OF THE INVENTION

The present invention provides the means to measure the detailed motion of an object's surface, such as a human face, accurately and in real time from video image sequences using image processing and analysis software implemented on a computer. The measurement includes not only motion of the object surface relative to external spatial coordinates, as in the time-varying changes of head orientation and position, but also local changes of configuration within the surface, such as deformation of the face during speech and expression.

A by-product of the invention is the accurate recovery of three-dimensional object coordinates from two-dimensional images. Thus, the processing speed and efficiency of analysis in two-dimensions is maintained for measurement of three-dimensional objects. The method is flexible in that it allows the user to choose the level of accuracy of measurement required by measuring multiple positions at any density up to one half the pixel resolution of the video image. Finally, since the measurement algorithm is applied iteratively at increasing density, accuracy beyond the pixel resolution is attainable.

A still further object of the present invention is to provide a computer-implemented apparatus, and the associated computer-readable media, for measuring surface motion that is capable of extracting accurate quantitative information related to the motion of any portion of an object's surface in real time from video images.

Specifically, the present invention measures surface motion of an object by measuring each portion of the object surface from a sequence of unit images of the object. The first step in this process is to initialize the measurement system on the first, "reference", image and to determine the initial positions of a plurality of measurement points at the maximum density (one half the pixel resolution or the image). The plurality of measurement points have a hierarchical structure consisting of different densities, with the higher density level including more measurement points than the lower level layer. The method further includes the step of determining the correspondence between measurement points of the first unit image, at the lowest level of the hierarchical structure including a plurality of levels, and points in the second image of the object. This process is iterated, starting from a level immediately above the lowest level and proceeding to the highest level.

As the number of measurement points is smaller at lower density levels, correspondence between the points of the second unit image with the measurement points of the first unit image can be found in a relatively short period of time. After the correspondence between the measurement points at the lower level is estimated, correspondence between the measurement points can be determined at the higher level with higher precision. As the coarse approximation has been attained at the lower level, complicated computation can be done at the higher level at a relatively high speed.

Preferably, the step of determining the measurement points includes the step of determining a plurality of reference points of the object image of the first unit image, and determining, based on the plurality of reference points, arrangement of the measurement points having a predetermined distribution. The method for determining the arrangement of the measurement points may include the step of mapping a plurality of points arranged at prescribed positions of a pre-selected, prescribed three-dimensional plane in accordance with the three-dimensional shape of the object surface, to an image plane, using the plurality of reference points as the reference.

As the correspondence between the points is determined after the points on the three-dimensional plane have been mapped to the image plane, the surface motion of the three-dimensional object can be followed on a two-dimensional image plane. Ideally, the method includes the further step of determining the three-dimensional position of the object by reverse-projecting, onto a prescribed three-dimensional plane, the points of the image of the object in the second unit image corresponding to the measurement points of the first unit image determined for the highest level.

Typically, the step of determining the points corresponding to the measurement points at each desired level of resolution includes obtaining subband images by wavelet transformation whose spatial frequencies correspond to the desired number of measurement levels. A prescribed relation is determined between segments of the subband image at the lowest level and the measurement point of the lowest level for the first unit image. The corresponding association between measurement points of the first and second unit images is determined by finding the highest correlation between the texture maps of the subband segments for the two images. This is done first at the lowest level and then for each pair of successively higher subband levels, by interpolating the position of the point corresponding to each of the measurement points at the lowest level with those at the next higher level.

Although the levels are usually processed in strict sequence, starting from the level immediately higher than the lowest level and proceeding one by one to the highest level, levels may be skipped in order to decrease processing time or depending on the characteristics of the object or its motion.

Another aspect of the present invention is the ability to measure portions of an object's surface by representing the position of each portion of the object surface in the first unit image by a mesh model including a plurality of nodes whose neighboring relations with each other are determined. Alignment of the mesh model with wavelet subband images for successive images and at successive resolution levels then proceeds as previously described, resulting in a plurality of mesh models at different node densities corresponding to the subband image densities. In this way, measurement of an object can be localized for the detection and measurement of specific features, such as mouth opening.

The change in measured surface position, either for portions or for the entire object surface, is obtained by: overlaying the plurality of coarse mesh models onto the corresponding subband images of each of the first and second unit images; calculating the cross-correlation between the texture maps of the overlay images obtained from the subband images corresponding to the first and second unit images; finding the correspondence between each node of the mesh model of the second unit image with each node of the mesh model of the first unit image; and calculating the relative change in position of each node from the first unit image to the second unit image. The hierarchical processing is carried out, as described for the first and second image of the sequence, for each pair of successive images in the image sequence, beginning with the first and second image in the sequence.

Another aspect of the present invention is the computer-readable recording medium that stores a control program for implementing the measurement method described above.

The control program is comprised of units that carry out: initialization of the first reference image, determination of the hierarchy of density levels, specification of the measurement regions on the object's surface, and the procedures for processing the image sequences and calculating the motion measurements of the object and any portion of its surface.

Depending on the exact specification of the task, the control program, implemented on one computer, can be executed simultaneously on any number of processors, either within the master computer or on other computers linked by a carrier signal (e.g., Ethernet). The program is flexible in that the processing task can be optimally distributed to the available processors. Finally, the control program is platform independent and can be implemented on any of the common computer operating systems—Unix, Linux, Windows, and Mac OS. Similarly, the control program can simultaneously control processors of different architecture.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hardware Configuration

Figure 1:
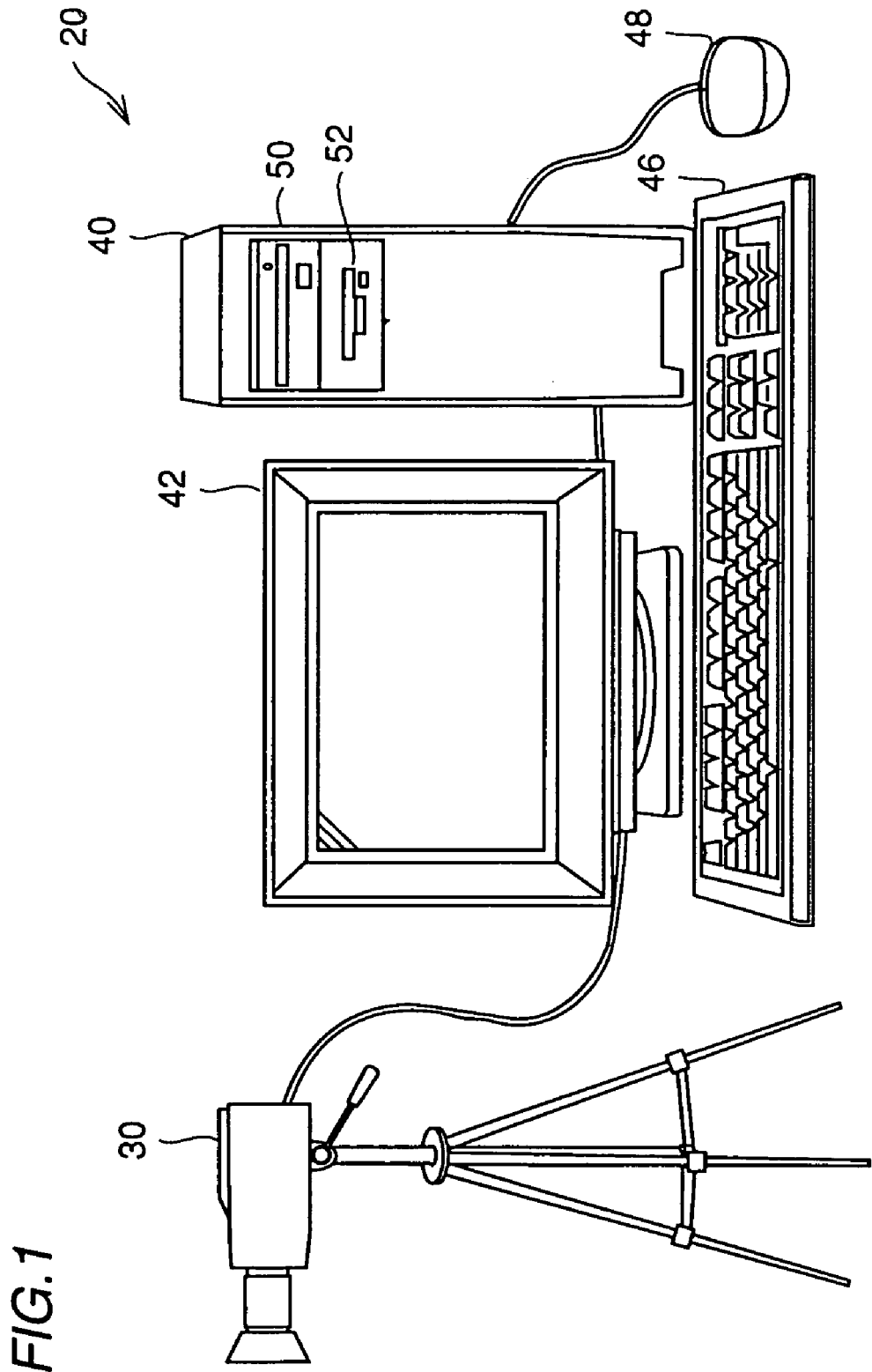
FIG. 1 shows an appearance of the system in accordance with an embodiment of the present invention.

In the following, a facial expression measuring apparatus in accordance with the first embodiment of the present invention will be described. The facial expression measuring apparatus is implemented by software executed on a computer such as a personal computer or a work station, for measuring motion of each portion of a person's face (facial expression) from a video image sequence of that face. FIG. 1 shows the appearance of the facial expression measuring apparatus.

Referring to FIG. 1, the system 20 includes a computer body 40 including a CD-ROM (compact disc read-only memory) drive 50 and an FD (flexible disc) drive 52, a display 42 as a display apparatus connected to computer body 40, a keyboard 46 and a mouse 48 as input devices connected to computer body 40, and a video camera 30 for picking up an image connected to computer body 40. In the apparatus of the present embodiment, video camera 30 refers to a video camera including a CCD (charge coupled device), and the camera performs the process of measuring the expression of the person in front of video camera 30 and operating the system 20.

Figure 2:
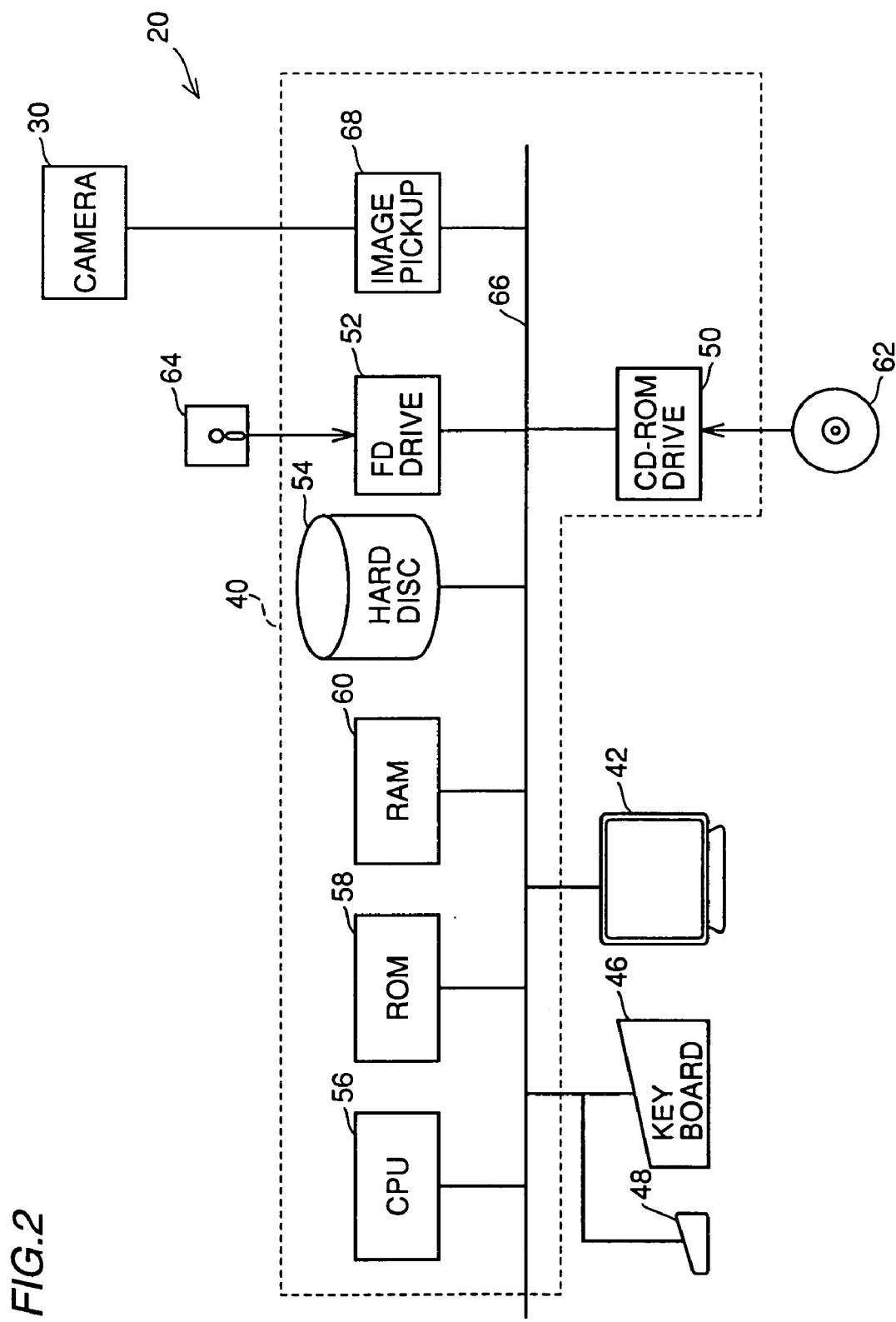
FIG. 2 is a block diagram representing hardware configuration of the system in accordance with an embodiment of the present invention.

FIG. 2 is a block diagram representing the configuration of system 20. As can be seen from FIG. 3, computer body 40 constituting the system 20 includes, in addition to CD-ROM drive 50 and FD drive 52, a CPU (central processing unit) 56, an ROM (read only memory) 58, an RAM (random access memory) 60, a hard disc 54 and an image pickup apparatus 68 for picking up an image from video camera 30, each connected to a bus 66. A CD-ROM 62 is loaded to CD-ROM drive 50. An FD 64 is loaded to FD drive 52.

As already described, the main portion of the facial expression measuring apparatus is implemented by a computer hardware and software executed by CPU 56. Generally, such a software is distributed stored in a storage medium such as the CD-ROM 62, FD 64 or the like, read from the recording medium by CD-ROM drive 50, FD drive 52 or the like and temporarily stored in hard disc 54. When the apparatus is connected to a network, the software is temporarily copied from a server on the network to the hard disc 54. The software is further read from hard disc 54 to RAM 60 and executed by CPU 56. When the apparatus is connected to the network, the software may not be stored in hard disc 54 but may be directly loaded to RAM 60 to be executed.

The hardware itself and the principle of operation of the computer shown in FIGS. 1 and 2 are generally known. Therefore, the most essential feature of the present invention resides in the software stored in the storing medium such as FD drive 52, FD 64, hard disc 54 or the like.

Recently, there has been a general tendency that various program modules are prepared as parts of the operating system of a computer, and an application program proceeds processing by calling the modules in a prescribed sequence as needed. In such a case, the software for implementing the facial expression measuring apparatus does not itself includes such modules, and the facial expression measuring apparatus is implemented for the first time when the software co-operates with the operating system of the computer or it's "environment". As long as a common platform is used, however, it is unnecessary to include such modules with distribution of the software; and it is considered that the software itself without such modules and the recording medium recording the software (as well as data signals when the software is distributed over a network) constitute an embodiment of the invention.

As described above, the present invention is substantially realized by software. In the apparatus in accordance with the present embodiment, the software performing the process of measuring motion of one's face (facial expression) has the following control structure.

Figure 3:
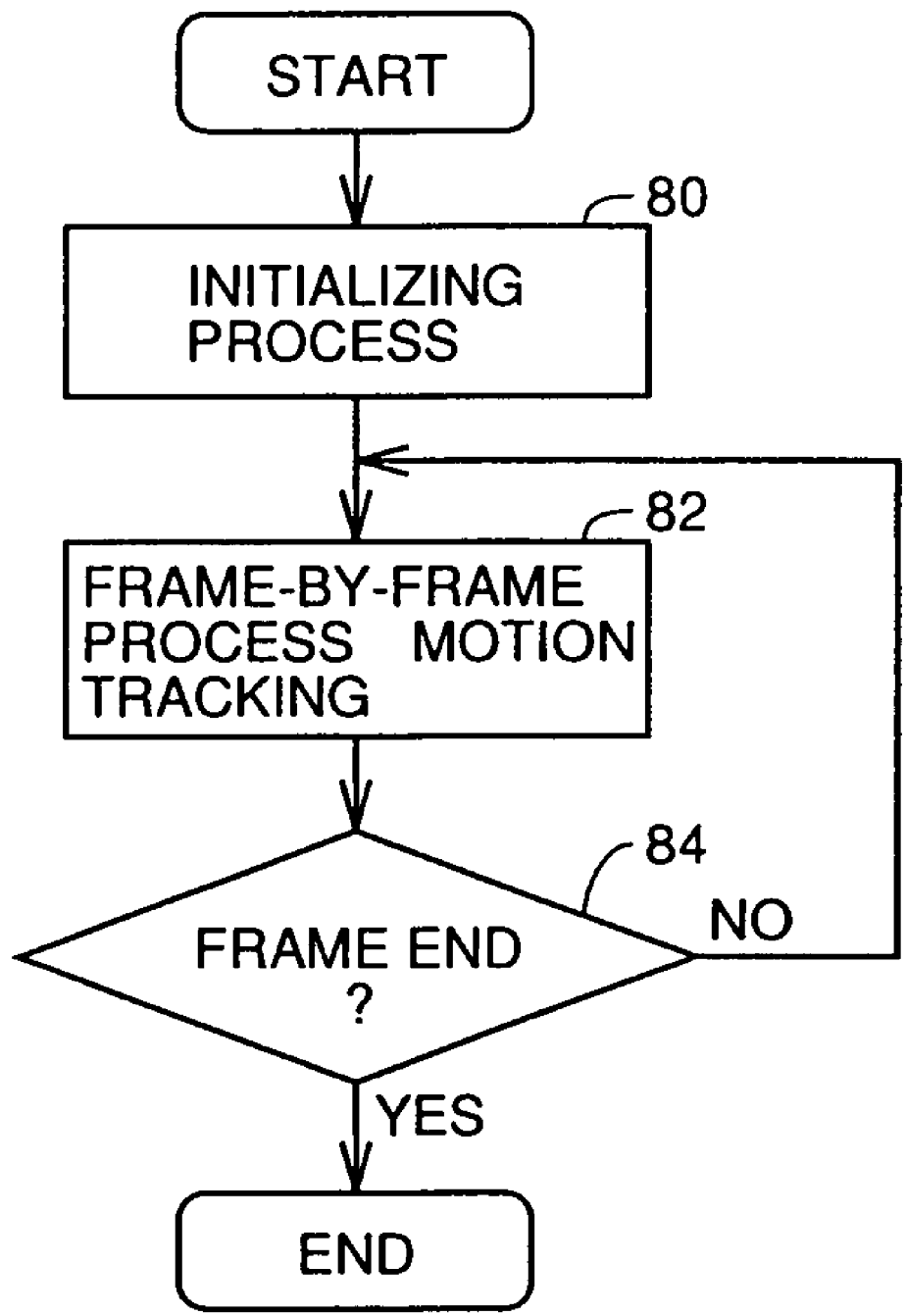
FIG. 3 is a flow chart of the overall process executed by the system in accordance with an embodiment of the present invention.

Referring to FIG. 3, first, an initializing process is performed (80) in which various preparations are made for motion tracking. The contents of the initializing process are described below with reference to FIG. 4. Generally, in this process, a reference image is chosen for measuring the subsequent motion of each portion of one's face. In the initializing process, an ellipsoid is fitted to the face area of the reference image and a mesh is applied thereto. After completing the initializing process, video image frames are picked up and frame-by-frame processing (motion tracking) is performed. The information representing each portion of one's face in a present frame is represented with respect to the reference frame (82) and stored in memory. Thereafter, whether all the frames of the video image have been processed or not is determined (84). If there is a next frame to be processed, the process following step 82 will be repeated; if there is no further frame input, the process is terminated.

In this manner, by the step 82, information representing the motion of each portion of the face image of the present frame relative to the reference frame can be obtained in a time sequence. As the result can be obtained for every input frame, the system is suitable for measuring facial expression from the video image on a real time basis.

Figure 4:
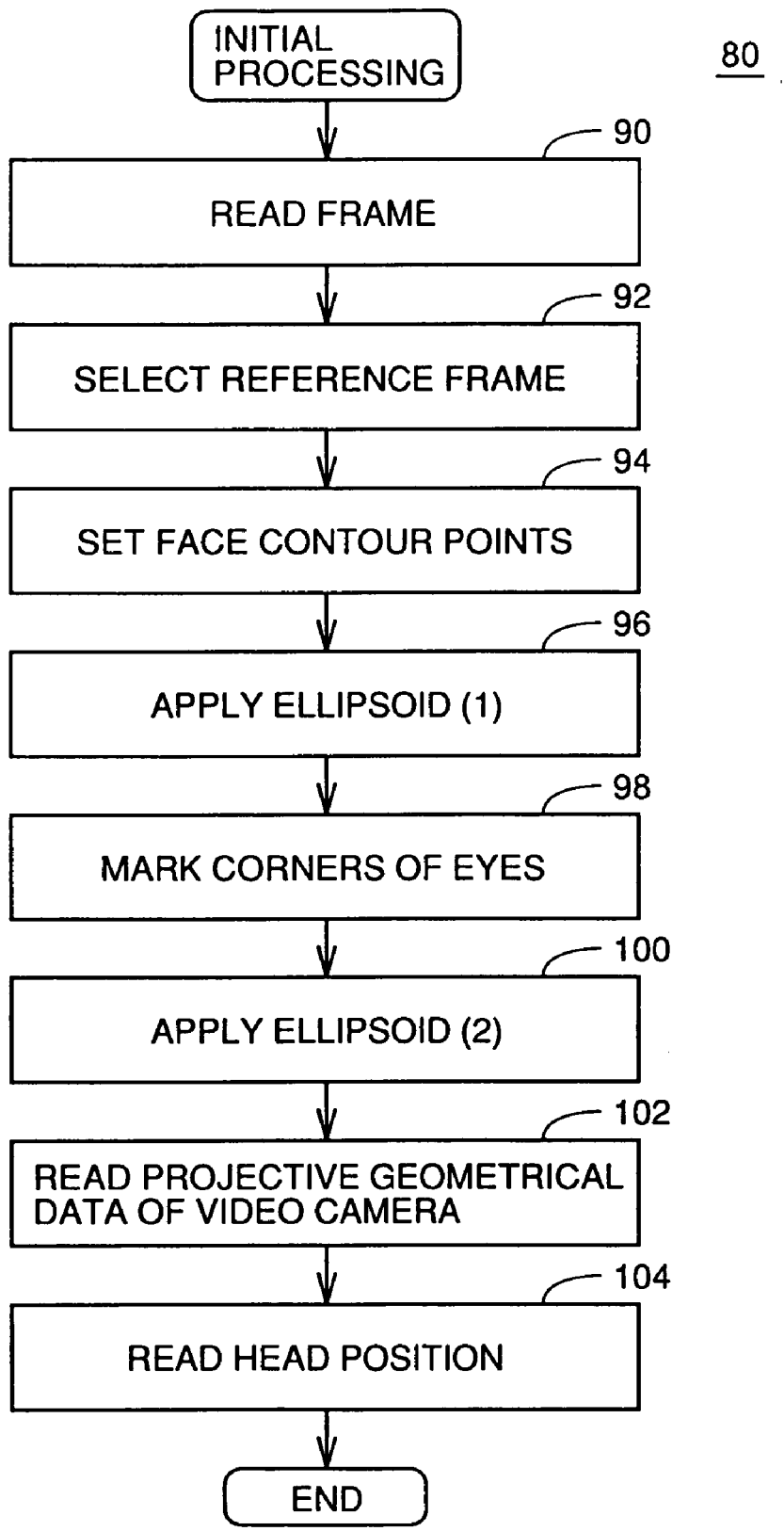
FIG. 4 is a flow chart of the initial process executed by the system in accordance with an embodiment of the present invention.

Referring to FIG. 4, the initializing process of step 80 shown in FIG. 3 is implemented by the following steps. First, one video image frame is read from video camera 30 shown in FIG. 1 (90). Here, it is assumed that the process is performed on a previously picked up image, and that in step 90, a number of first frames are read. The video image input here may be of any format, and similar effects can be obtained no matter whether it is a color image or a gray scale image. Note also that image fields can be processed instead of frames, if greater temporal precision is required.

In step 92, which image frame among the read frames is to be used as the reference image is determined. The reference image, hereinafter called the "reference frame", can be selected interactively by the user, as shown here, or automatically according to user-selected criteria. The reference frame will be the reference for the determining the position of each portion of the face in the subsequent analysis.

Figure 9:
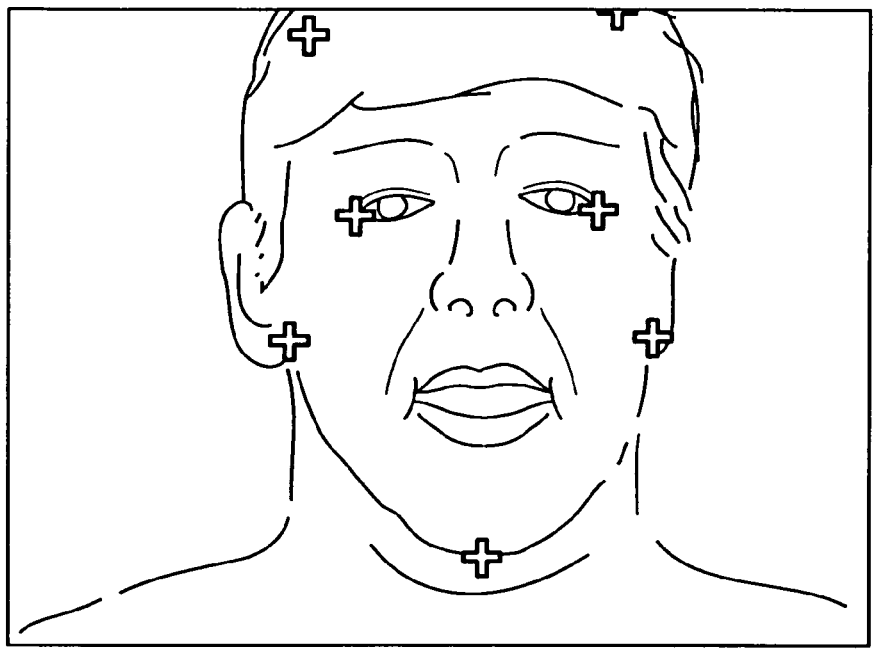
FIG. 9 represents a process of designating corners of the eyes of a person in the initial processing.

Thereafter, a process of determining a contour of the face image of the reference frame takes place (94). In the apparatus of the present embodiment, the contour is determined by the operator designating at least four points of the image. FIG. 9 shows the four points designated. In FIG. 9, the four designated points are represented by four white "+" signs. Of these four points, two are close to earlobes, and the remaining two are close to the upper end of the image.

Figure 10:
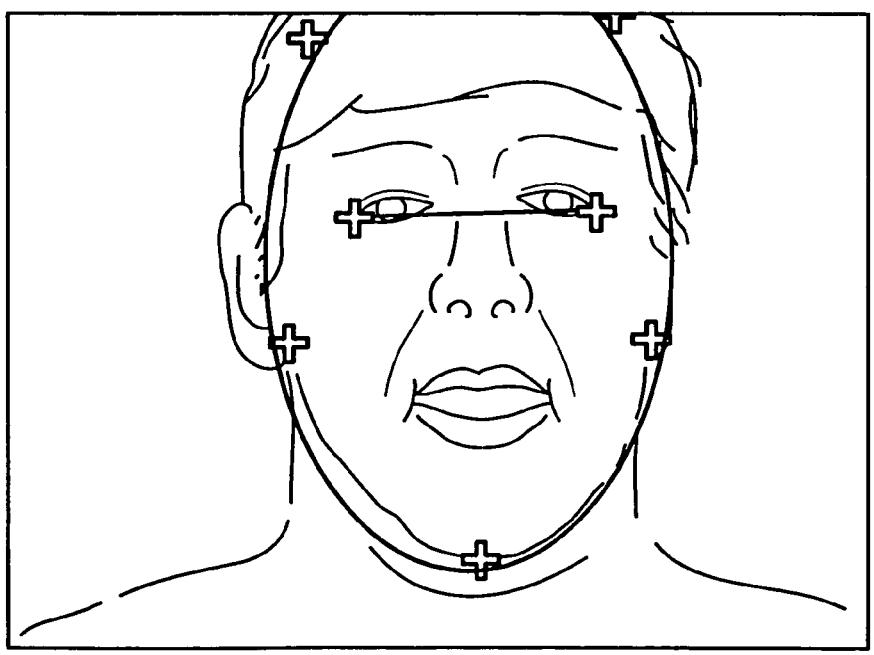
FIG. 10 represents a state in which an ellipsoid fitting a face area is estimated and drawn, based on the designated corners of the eyes of the person in the initial processing.

After these points are designated, the center of an ellipsoid which just fits these points is determined by a prescribed algorithm (96). For this process, Downhill simplex minimization method is used. Downhill simplex minimization is a method in which the difference from a target value is represented as a function of a parameter determining an attribute of the object of control (position, size and other attributes) and the parameter is determined so as to minimize the difference. An example of the determined ellipsoid is shown in FIG. 10.

This ellipsoid is aligned such that the direction of the short axis matches the direction of a line connecting the corners of the eyes. For this purpose, the process of marking the corners of the eyes is performed by the operator in step 98. As both axes of the ellipsoid are determined in this manner, the direction of the mesh model, which will be described later, is determined. As the face area is determined in this manner, consistent results can be obtained even when the subject is changed.

After both axes of the initial ellipsoid are determined, fine adjustment for optimizing the angle, position and size of the ellipsoid is made by an optimizing method similar to the process performed in step 96, again. By this process, an ellipsoid is obtained whose size and direction are determined to well match the subject's face area.

The approach in this stage has two main features. First, the influence of particular points on one's face contour on the finally obtained ellipsoid is minimized. Second, even when part of the face area is out of the image, the face area can be designated precisely.

Figure 11:
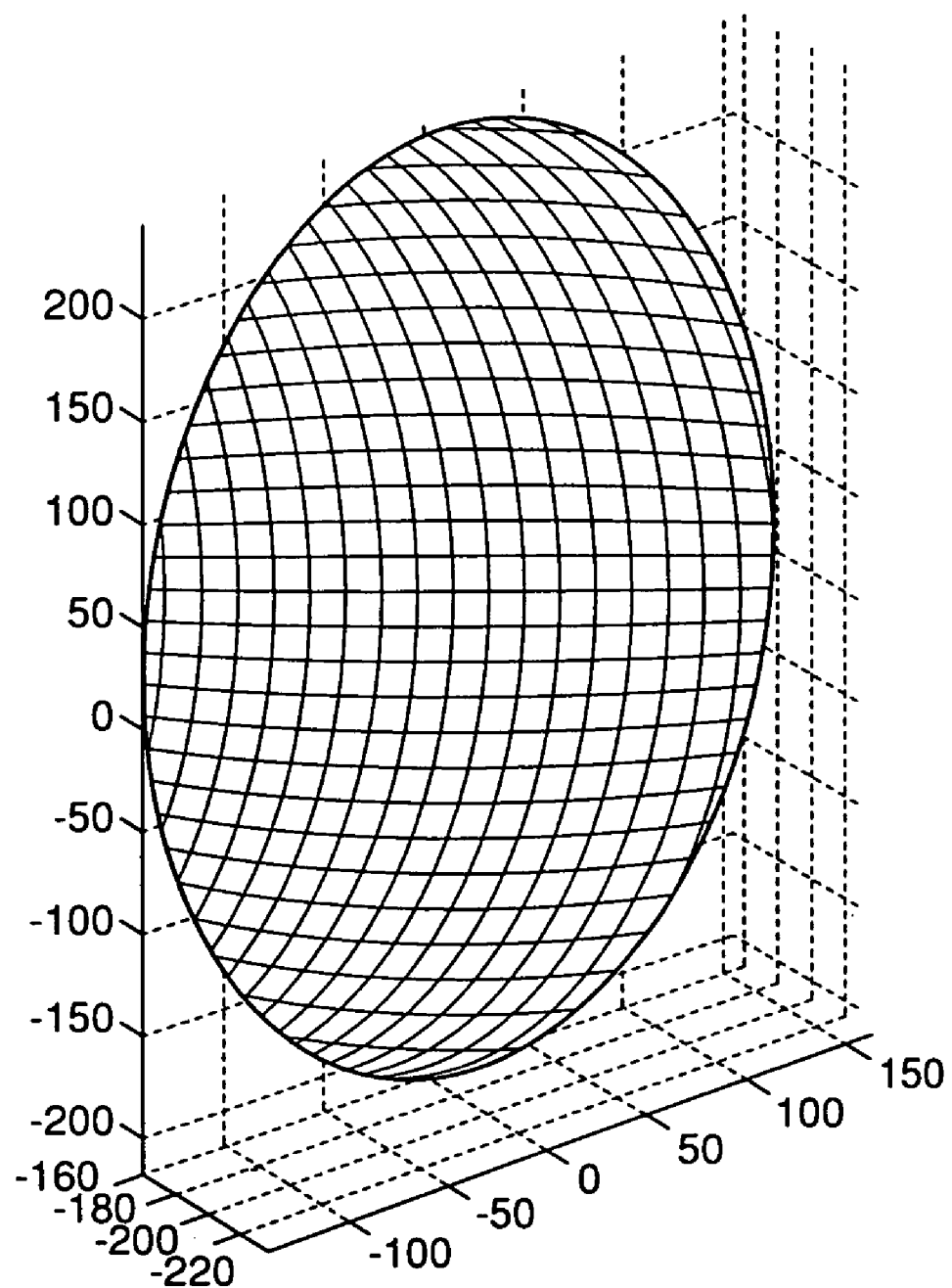
FIG. 11 is a three dimensional representation of the ellipsoid fitting one's face and the mesh applied on the ellipsoid.
Figure 12:
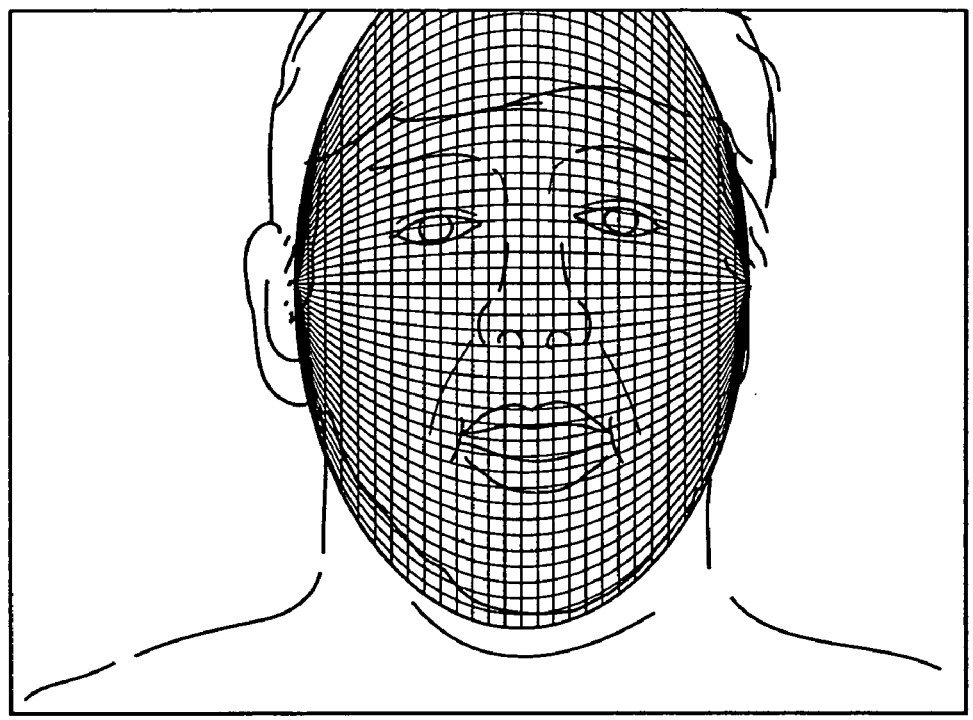
FIG. 12 shows a state in which the meshed ellipsoid is fitted on a face image of a person.

When an ellipsoid fitting the face area is determined in this manner, an initial value of a three-dimensional mesh model is calculated, using a series of initial values which can be set in advance, and a parameter specifying the ellipsoid determined from the face area of the reference image. An example of the three-dimensional mesh model is shown in FIG. 11. The mesh model is defined as a set of nodes distributed on the surface of a three-dimensional ellipsoid. It is assumed that nodes are arranged in a mesh at a prescribed distance, on the surface of the ellipsoid. FIG. 12 shows the mesh model superposed on the face image. By the positions of the nodes on the mesh model, three-dimensional positions of various portions of one's face can be represented.

The parameter of highest significance here denotes how many pixels on average should be arranged between each of the mesh nodes. Depending on the specified number, resolution of the position of each portion of the face to be measured is determined. Furthermore, the range of spatial frequency analyzed by the wavelet transform (described below) is determined.

The basic preparation for measuring motion of each portion of the face is thus completed. It should be noted, however, that the image may be distorted because of an optical parameter (for example, focal distance) of the video image used for image pickup. For compensation thereof, a projective geometrical data of the video camera is read (102).

Change in facial expression of a person generally involves head motion. When the head moves, the face area naturally moves, and therefore, it is necessary to measure the head motion and to compensate for the motion of the face area resulting from the head motion, in order to precisely measure the motion of each portion of the face. The reference position of the head for this purpose is read in step 104. In the following embodiment, the subject wears a sensor for measuring the head position. The invention is not limited to such an approach, which has been used as a matter of convenience in developing the invention; rather, the head motion may directly be detected from the video image.

Figure 5:
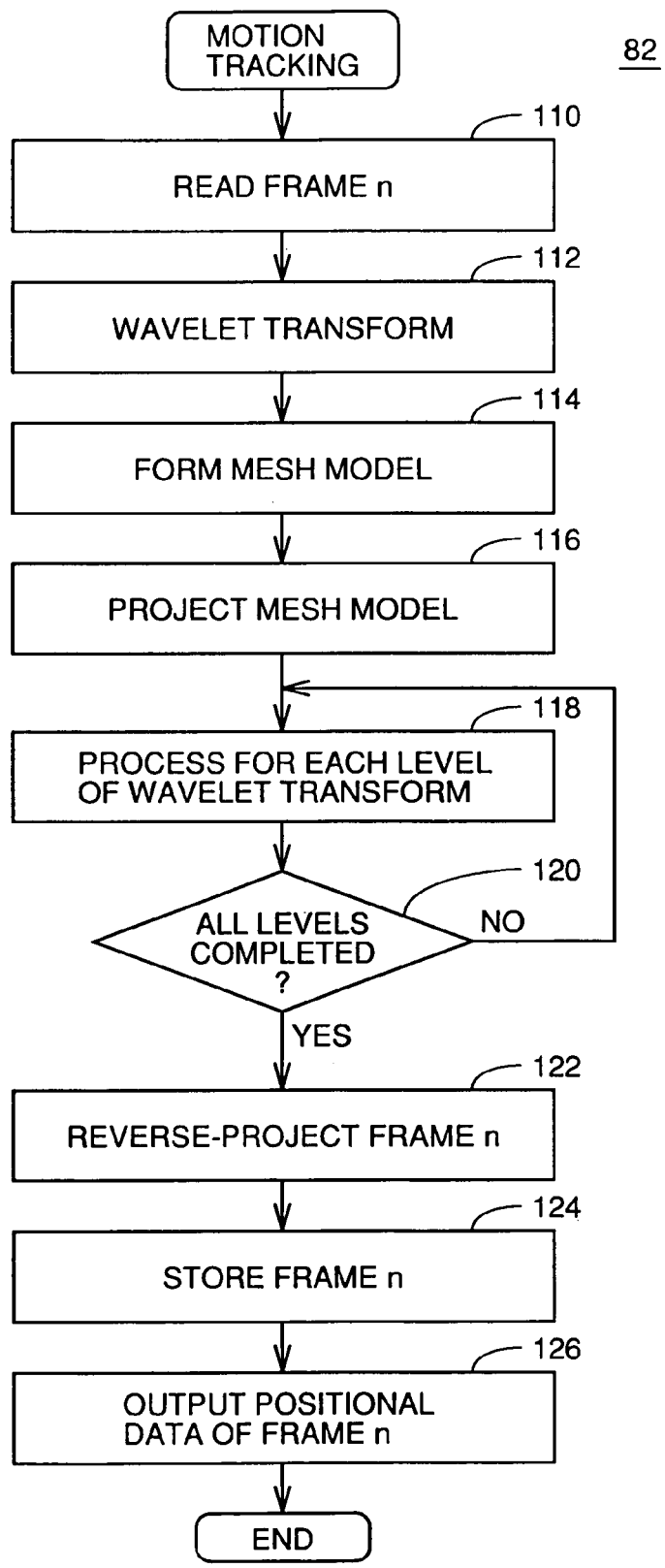
FIG. 5 is a flow chart of a motion tracking process executed by the system in accordance with an embodiment of the present invention.

The process of frame-by-frame motion tracking, see step 82 of FIG. 3, is now described. Basically, the process of motion tracking is done by determining the location changes of small parts of the facial surface between successive frames. Referring to FIG. 5, the first step is to read (110) the first frame as the object of processing (hereinafter referred to as "frame n").

Figure 13:
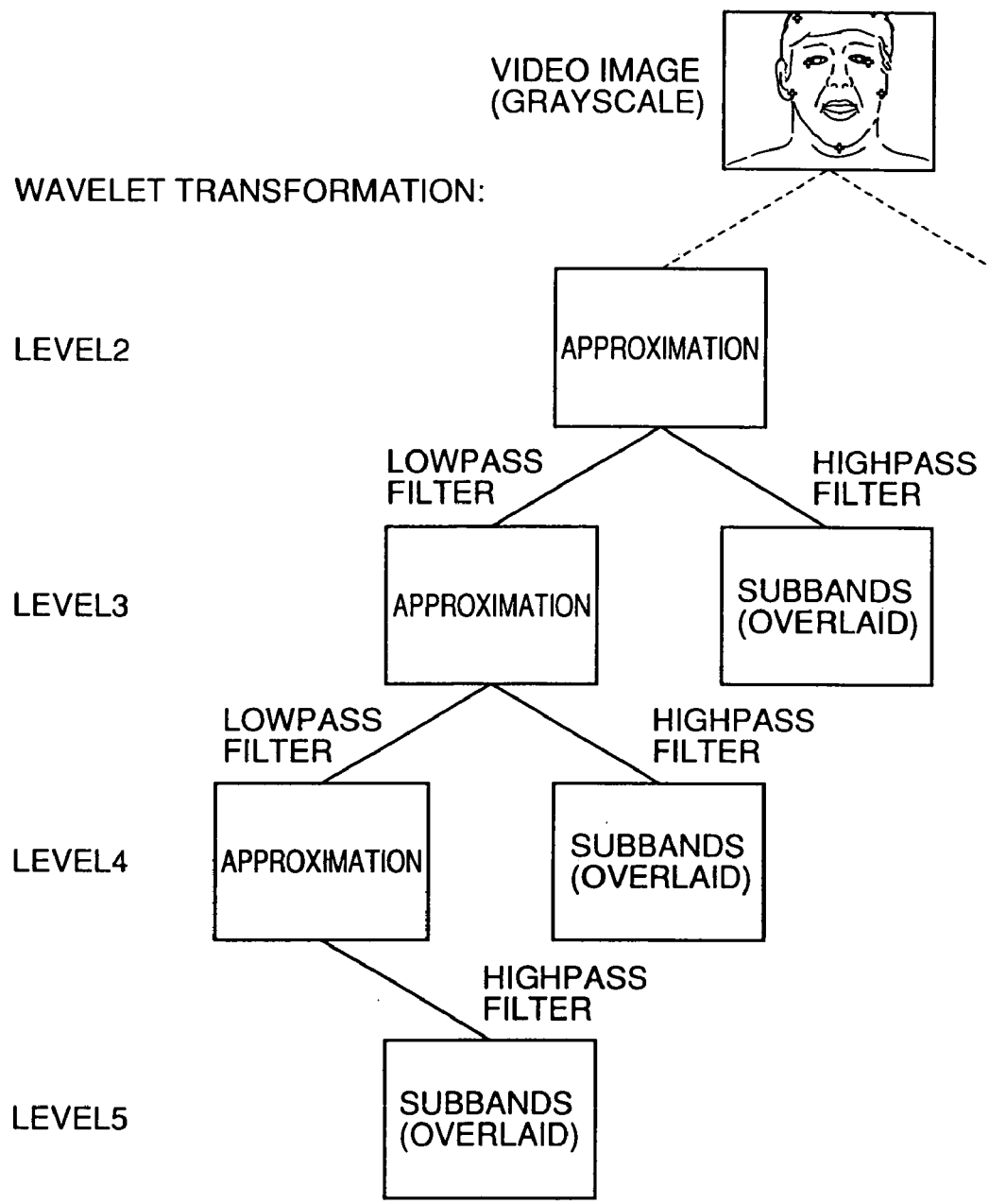
FIG. 13 represents information obtained at each level of wavelet transform.

In step 112, all the pixels constituting the image of the read frame n are subjected to multi-resolution, two-dimensional discrete wavelet transform (DWT) (112). This is equivalent to passing the image of frame n through a set of band-pass filters—i.e., paired low pass and high pass filters whose characteristic are adjustable in accordance with the purpose of analysis, as shown in FIG. 13. In this process, a filter that corresponds to a biorthogonal scheme with spline wavelets having compact support is used.

The two-dimensional DWT provides four outputs. The first is a so called "approximation" output which contains the low frequency part of the signal. This is used as input for the wavelet transform of the next lower level. The second to fourth are so-called "details" or "subband" outputs, and contain the higher frequency component. The subband outputs include three outputs in the diagonal direction, horizontal direction and vertical direction. FIG. 13 represents the relation between the original image (gray scale) and the approximation and subband outputs of each level. The subband outputs refer to the outputs of the high pass filters of respective levels.

In order to obtain the approximation, the input signal's image matrix is filtered along both rows and columns with the low pass filter. To obtain the diagonal subband output, the same process is repeated using the high pass filter. To obtain the vertical subband output, the image matrix of the input signal is filtered along the rows with the high pass filter and along the columns with the low pass filter. For the horizontal subband output, the filters for the vertical subband output are exchanged. In the present embodiment, only three subband outputs are used at each level of the DWT.

Again referring to FIG. 5, a mesh model for frame n is generated from the mesh model obtained for the frame n-1 (114). Thereafter, the mesh model obtained in step 114 and the mesh model finally obtained for the preceding frame are projected on an image plane so as to correct the head motion obtained for the frame n (116). Further, by steps 118 and 120, the process shown in FIG. 6 is repeated, as will be described later, on each level of wavelet transform.

By the time the process of step 118 has been done on all the levels of the wavelet transform, the information representing which node of frame n corresponds to which node of frame n-1 on the image plane is obtained. Based on this information, it becomes possible to determine which portion of the face area has moved how much from the corresponding portion of the reference frame. As the information is two-dimensional, it is reverse-projected to the three-dimensional value corresponding to the original face area (122). Thus the three-dimensional position of each portion of the face in frame n is established.

Thereafter, the mesh model obtained for frame n is stored for use in step 116 for the next frame, position data for each node of the mesh model of frame n are output (126), and the process of motion tracking for the frame n is completed.

Figure 6:
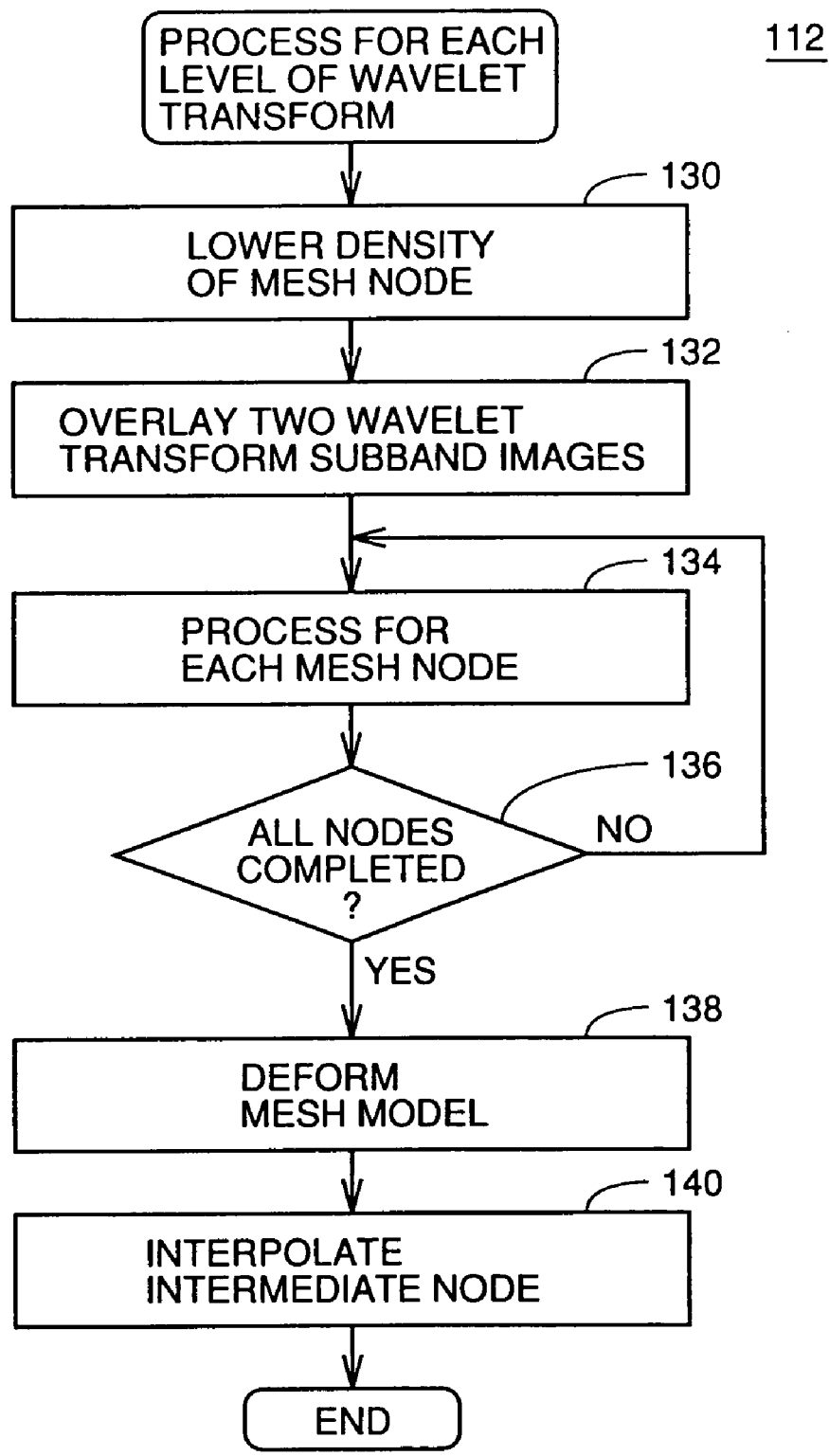
FIG. 6 is a flow chart showing, in greater detail, the process for each level of wavelet transform, shown in FIG. 5.
Figure 7:
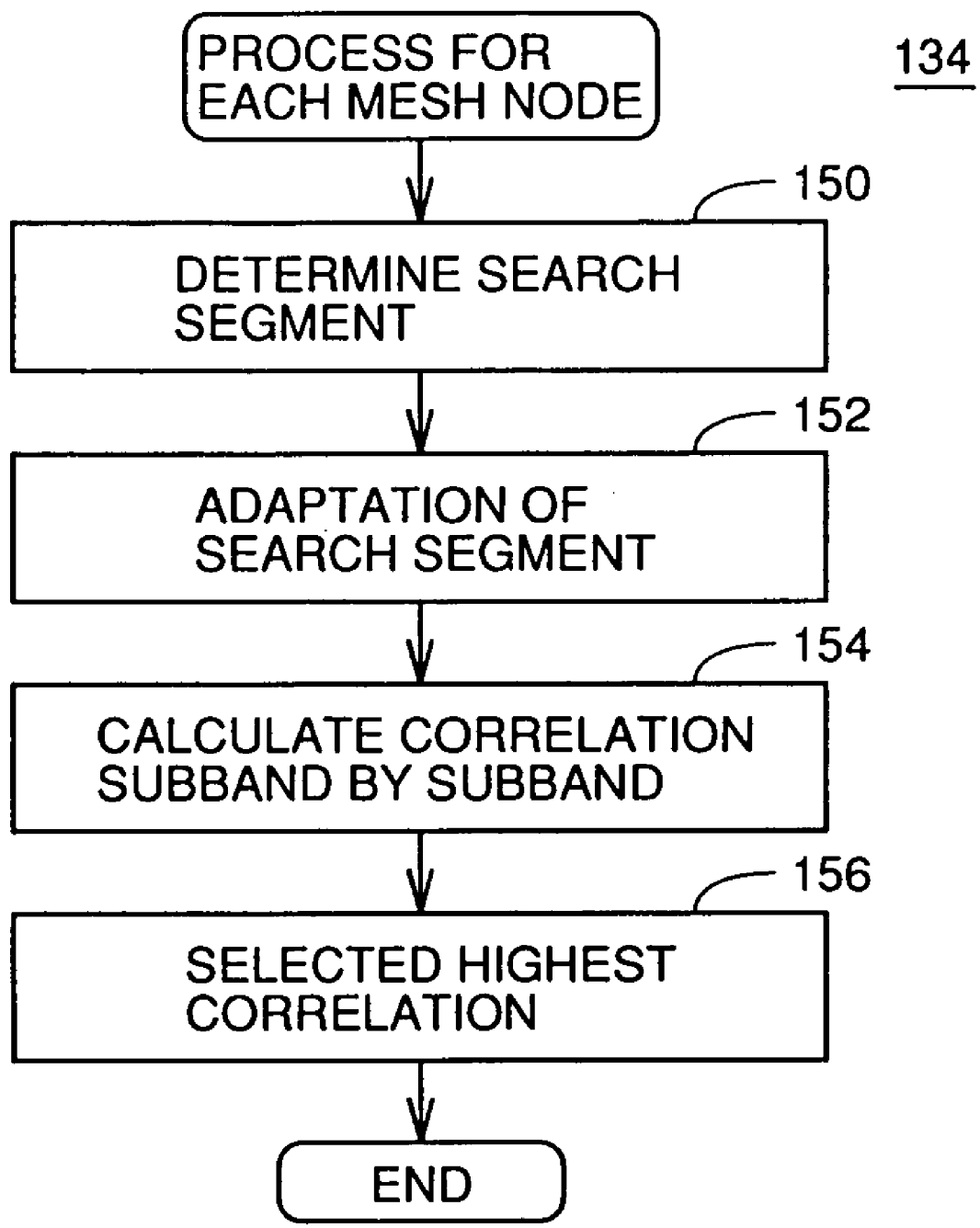
FIG. 7 is a flow chart showing, in greater detail, the process for each mesh node shown in FIG. 6.

Next, referring to FIG. 6, the process at each level of the wavelet transform, occurring in step 118 of FIG. 5, is described. First, the number of nodes of the mesh model is reduced in correspondence with the level of wavelet transform (130). The mesh model with the node density reduced will be referred to as a "coarse mesh model" in the specification. In the present embodiment, the density of the nodes used at each level is selected to be one half in a lower level. The process starts from level 1. In the wavelet transform shown in FIG. 13, level 5 is the highest level, and it is assumed that the level lowers as the number of levels reduces. The higher the level, the higher the spatial frequency of the image is after wavelet transform.

The basic approach is as follows. Correlation between each node of the image after wavelet transform of frame n and each node of the image after wavelet transform of the frame n-1 is calculated by using a mesh model with low node density, whereby correspondence between the nodes of the two images can be found. As the node density is low, this process can detect relatively large motion for each region of the face. It is assumed that large motions affect large regions of the face, thus insuring coherence between the regions processed at low node density.

Thereafter, based on the motion of each node of the mesh model having low node density detected in the above described manner, the approximate position of each node in a mesh model having higher node density can be determined. Particularly, a node which does not exist in the mesh model of the low node density but existing in the mesh model of higher node density can be estimated by interpolating positions of the nodes in the mesh model of lower node density. The mesh model of higher density thus obtained is superimposed, or overlaid, on the wavelet transform image of the corresponding level. By calculating the correlation of the mesh model and the wavelet transform image of the corresponding level of frame n-1 again, the motion of each node from the previous frame n-1 at this level can be determined.

By successively repeating this process from the highest to the lowest level, eventually, the position of each portion of the face can be determined accurately at fine resolution.

This process (see "process for each level of wavelet transform") is realized by executing the steps successively from the higher level to the lower level. That is, the mesh model of lower density obtained from the previous level is used for generating the initial mesh model of the next higher level.

Again referring to FIG. 6, in step 130, the following process is performed on the mesh nodes of reduced density, in accordance with the level of the object of processing.

In step 132, the mesh model is overlaid on the subband image of the wavelet transform for the present level of the frame n image, and the mesh model of frame n-1 is overlaid on the wavelet transform image of the present level for the subband images of frame n-1.

Thereafter, in steps 134 and 136, the following process is performed on each node of the mesh model, to determine the correspondence between the nodes.

The process described above is performed on every node, and the position of each node of the frame n is moved in accordance with the determined correspondence, so that the mesh model is deformed (138).

To the thus obtained deformed mesh model, the position of an intermediate node is calculated by interpolation, and is inserted in the mesh (140). The mesh model obtained in this manner is used for processing the next level. The process is thus completed.

The process performed for each node of the mesh in step 134 of FIG. 6 is as follows.

First, a search segment is determined (150). Motion detection is based on a two-dimensional cross-correlation calculation using the texture map of the face of two consecutive images. Therefore, it is necessary to define a suitable area around each mesh node. This area will be referred to as a search segment. In the present embodiment, a search segment 160 associated with a node 170 of the mesh model for frame n is a polygon 180 surrounded by four nodes 172, 174, 176 and 178 adjacent to node 170, as can be seen from the upper part of FIG. 8.

Figure 8:
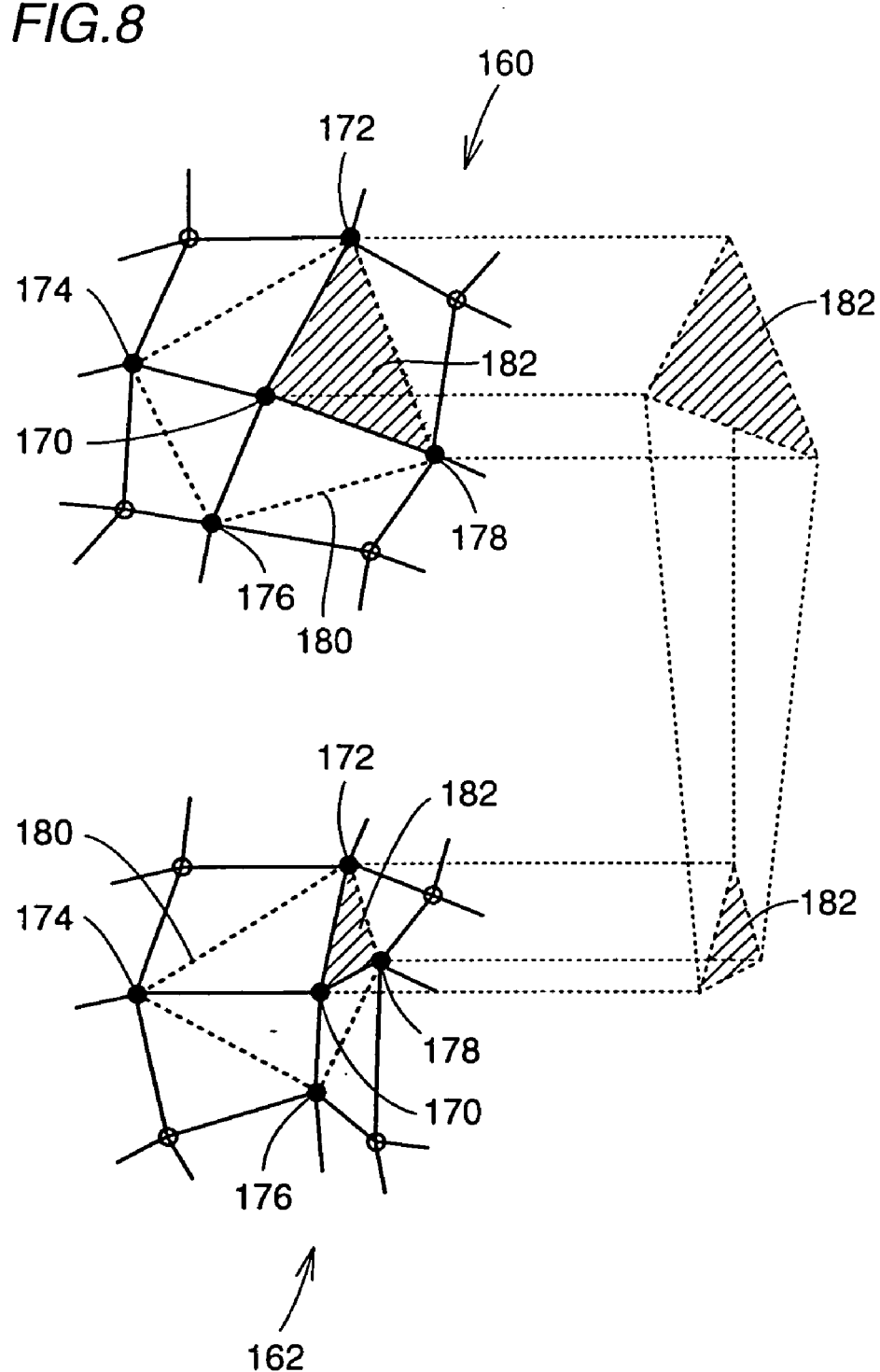
FIG. 8 is an illustration of the adaptation of a search segment.

By DWT without sub sampling, a certain discrete value (pixel value) is calculated for each pixel of the image. By the pixel values of all the pixels in the polygon 180, the texture map of search segment 160 is determined. The search segment thus determined has to be adapted in order to cope with known distortions of the corresponding search segment in the next neighboring frame (152). More specifically, the search segment 160 shown on the upper part of FIG. 8 is distorted in the same manner as the corresponding search segment 162 of the neighboring frame. Adaptation here is performed using an element 182 constituting each polygon 180 as a unit.

Distortion is considered to be derived from different motions of adjacent nodes and has two possible sources. The first is the head motion. As the head motion is in most cases not strictly parallel to the image plane, the motion of each node deviates. This source of distortion is small and may be corrected by specifying parameters for the projection between the two- and three-dimensional representations of the object. The second source of distortion derives from interpolating the node coordinates that result from motion tracking with the coarse mesh of the previous wavelet level. The second source is more severe. However, it has been created in step 140 to counteract a large distortion that occurs when the person opens his/her mouth, for example. Without the consideration of this distortion (and the necessary adaptation), areas such as that within the opened mouth, where there is no reliable texture map, would inevitably introduce large errors.

Thereafter, in step 154, calculation of the correlation between texture maps corresponding to the search segments of the nodes of frames n and n-1 is performed for each subband, and the results of all the subbands are summed. By this calculation of the correlation, correspondence between the nodes is obtained and, as a result, measurement of positions for each portion (node) of the face is actually obtained. More specifically, as a result of the cross-correlation described above, correspondence between a certain segment of the frame n and a certain search segment of the frame n-1 is found, and the amount of motion of the central node of the search segment of frame n is determined. This is the motion vector of that node.

It should be noted here that as the (distorted) mesh obtained for frame n-1 is first applied to the image of the frame n, the positions of various portions of the face have been roughly estimated. More specifically, at the coarsest level wavelet transform, the effect of head movements is taken into account, and on the denser level wavelet transform, the effect of the already detected motion is considered. For example, if the chin moves with a large jaw opening or closure, the motion will already be registered at the coarsest level. Thus, the starting position for detecting a region close to the chin, —e.g., part of the lower lip—will be shifted in accordance with the movement of the chin.

Further, not only the position of each portion is approximately estimated or predicted in advance, but also the shape of the search segment, and with this the expected texture map, can be estimated. Again taking the example of the large jaw movement, the texture map of a smaller segment located right at the corner of the mouth will undergo dramatic changes. Using the results of the motion tracking on the coarser level and the adaptation procedure described above, these changes will be approximately predicted.

As described above, to estimate the position of the search segment, cross-correlation on the texture map of subband images of two successive frames is used. At this time, as the rough position of each search segment has been already found, it is not necessary to calculate correlation of a certain search segment of the frame n with every search segment of the frame n-1. The calculation is necessary only for the vicinity of the rough position known in advance. Therefore, the computation of correlation at the denser level is reduced, and the probability of introducing erroneous determination by calculation is also reduced. Thus, the problem of finding a reasonably constrained motion vector for the cross-correlation with sufficiently high precision at low computation cost in calculating the cross-correlation remains.

One solution to this problem is to represent the position of each pixel in the search segment by coordinates relative to the center node of the search segment being treated as the origin. This allows detection of larger motion by the motion vector if the neighboring nodes are father away from the center node, and detection of only a small shift, if the search node/segment as a whole is compressed with the neighboring nodes near to the center node. The same applies where the neighboring nodes are farther apart from the center node in one direction and the neighboring nodes are close to the center node in another direction.

This process makes use of the fundamental property that the facial area of the video image is continuous. As the analysis starts from an equally spaced mesh, it can be assumed that the parts of the surface that were stretched out due to the facial motion are very likely to be contracted again eventually, and vice versa.

Figure 14:
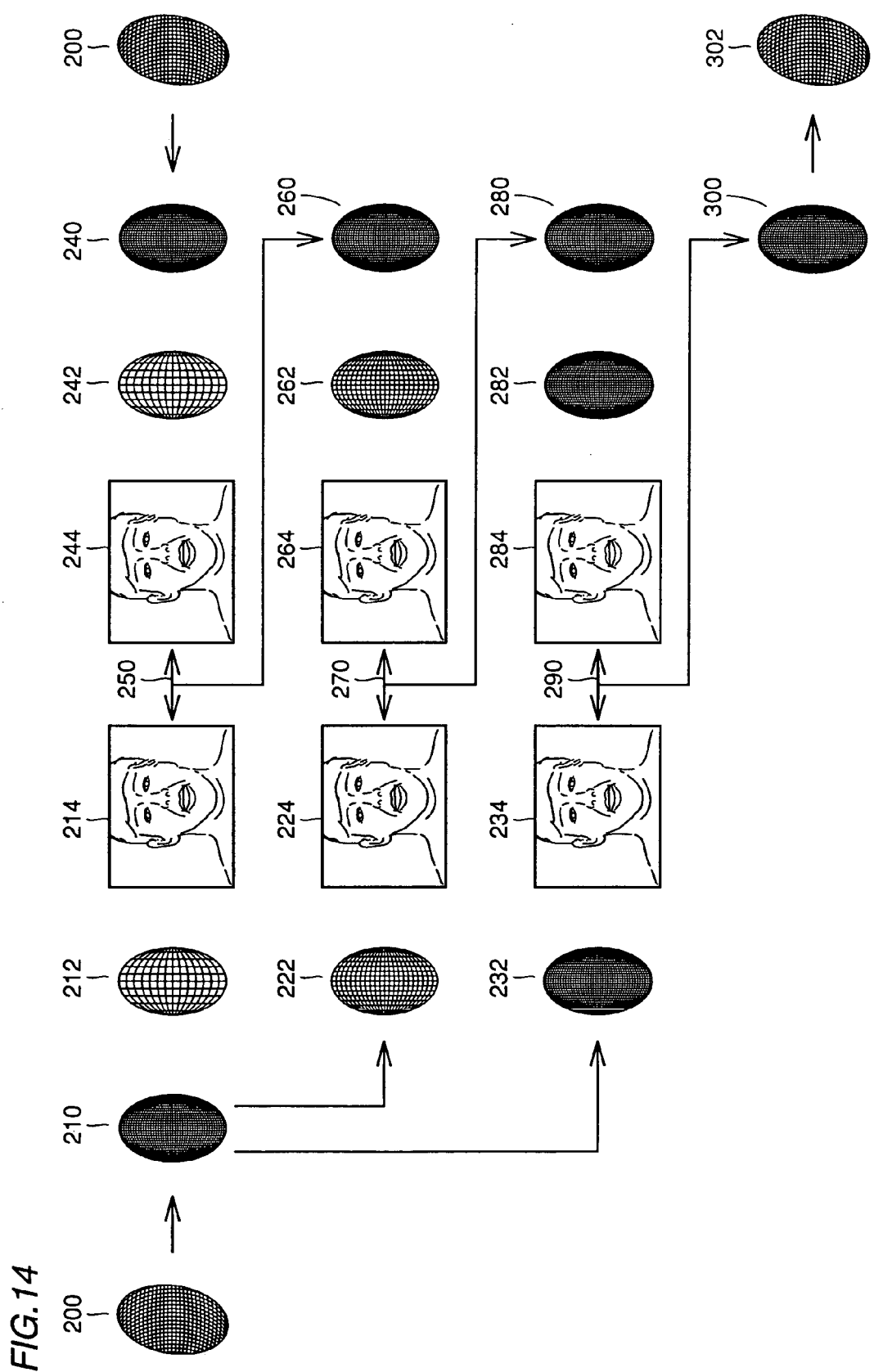
FIG. 14 represents relations among pieces of information in the system in accordance with an embodiment of the present invention.

By the process described above, it is possible to calculate in real time the motion of each portion of one's face from an incoming series of video images. The overall flow of the processes described above is now summarized, with reference to FIG. 14.

First, the mesh model 200 of frame n-1 is projected on an image plane using positional data of the head of frame n-1, for example (210). A mesh model of the coarsest mesh level is generated for the projection 210 (212), and the model is overlaid on the subband image of the wavelet transform of the lowest level (214). The same process is repeated for the second coarsest mesh (222), on the subband image of the second level wavelet transform (224), on a mesh model of the densest mesh level (232) and on the subband image of the third level wavelet transform (234). The steps up to here can be done using the data of the frame n-1.

For the frame n, the mesh model 200 of the frame n-1 is first projected on a coordinate plane, using positional coordinate data of the head of frame n, for example (240). From the mesh model 240, the coarsest mesh model (242) is generated, which is overlaid on the subband image of the highest level wavelet transform (with lowest spatial frequency) (244). Using the texture map of the subband image 244 and the subband image 214 of the frame n-1, cross-correlation between the search segments is obtained (250), whereby the position of each node at the coarsest level of frame n is predicted.

Thereafter, a deformed mesh model 260 is generated, considering the movements of the nodes of the coarsest model thus predicted, and the node density of mesh model 260 is lowered to twice that of mesh model 242 from the original density, to provide a mesh model 262. The mesh model is overlaid on the subband image of the wavelet transform (264) at the second level, and further, correlation is calculated using the texture map with the subband image 224 of the frame n-1 (270), whereby the cross calculation of each search segment is performed. Thus, the position of each node at the second coarsest level of the frame n is estimated.

Thereafter, a deformed mesh model 280 is generated according to the movements of the nodes at the second coarsest level thus predicted, and the node density of the mesh model 280 is raised to twice that of the mesh model 262, whereby mesh model 282 is generated. In this description, mesh model 282 has the highest node density. The mesh model is overlaid on the subband image of the wavelet transform of the densest level (with the highest spatial frequency), and correlation is calculated using the texture map with the subband image 234 of the frame n-1, whereby cross calculation of each search segment is performed (290). In this manner, the position of each node at the densest level of the frame n is estimated. Using the motion vector of each search node thus obtained, the original mesh model 240 is deformed (300) and three-dimensionally reverse-projected, so that a mesh model of the frame n is obtained (302).

The above-described embodiment has the function of measuring movement of each portion of one's face from the video image. The present invention is not limited thereto, and it is generally applicable to methods and apparatuses for measuring surface movement of any object or animal that generates fine local movement similar to a human face.

Though the process described above is performed frame by frame, the process may be performed field by field if the image signals are subjected to "skip-scanning". Alternatively, one frame may be divided into sub areas and the process described above may be performed on the basis of each sub area. In short, when a sequence of unit images consisting of frames, fields or portions of a frame is to be processed, the process should be done on the basis of each unit image; and what is to be used as the unit image may be appropriately determined depending on the application.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of measuring the surface motion of each portion of an object surface from a sequence of unit images of the object including first and second unit images, comprising the steps of:

determining a plurality of measurement points in an image of said object of a first unit image, said plurality of measurement points having a hierarchical structure of a plurality of levels, with the higher level layer including measurement points larger in number of than the lower level layer;

determining the points in said object image of said second unit image, corresponding to the measurement points of said first unit image of the lowest level of the hierarchical structure of said plurality of levels; and repeating, starting from a level immediately upper than the lowest level to the highest level, the determination of the points corresponding to the measurement points of the first unit image at each level in the image of said object of said second unit image, based on the points corresponding to said measurement points of said first unit image at an immediately lower level of each level in the image of said object of said second unit image.

2. The method of measuring surface motion according to claim 1, wherein said step of determining measurement points includes the steps of determining a plurality of reference points of said object image of said first unit image, and determining, based on the plurality of reference points, arrangement of the measurement points having a predetermined distribution.

3. The method of measuring surface motion according to claim 2, wherein said step of determining the arrangement of the measurement points includes the step of mapping a plurality of points arranged at prescribed positions on a pre-selected prescribed three-dimensional plane in accordance with the three-dimensional shape of the object surface, to an image plane of said image, using the plurality of reference points as the reference.

4. The method of measuring surface motion according to claim 3, further comprising the step of determining the three-dimensional position of said object by reverse-projecting, onto a prescribed three-dimensional plane, the points of the image of said object in the second unit image corresponding to said measurement points of said first unit image.

5. The method of measuring surface motion according to claim 3, wherein said step of determining the points corresponding to the measurement points includes the steps of obtaining subband images by wavelet transform, with a plurality of resolutions of the same number as said plurality of levels, the object images of said first and second unit images, the plurality of resolutions being in correspondence with the plurality of levels and resolution corresponding to a lower level being selected to be lower;

determining the correspondence between the corresponding subband images of the lowest level and the measurement points of said lowest level, for said first unit image;

determining image segments having a prescribed relation with each of the measurement points of said lowest level of said subband images of said lowest level obtained for said first unit image; and determining the positions of points in said second unit image, corresponding to each of the measurement points of said lowest level in said first unit image, by determining an image segment of said subband image of said lowest level obtained for said second unit image that represents the highest correlation with the texture of each said image segment.

6. The method of measuring surface motion according to claim 5, wherein said step of determining the points corresponding to said measurement points further includes the step of estimating the position of each of the measurement points at the level immediately higher than said lowest level by interpolating position of the point corresponding to each of the measurement points at the lowest level.

7. The method of measuring surface motion according to claim 6, wherein said step of repeating includes the steps of repeating, starting from the level immediately higher than the lowest level to the highest level one by one, the steps for each level, including the steps of regarding, for said first unit image, each of the points of which position is estimated for the level immediately lower than said each level as a measurement point of said each level, determining an image segment having a prescribed relation with the measurement points of each level, in the subband image corresponding to said each level, and determining, in said second unit image, a position of the point corresponding to each of the measurement points of each level of said first unit image, by determining the image segment of said subband image of the corresponding level obtained for said second unit image, that represents the highest correlation with the texture of each said image segment.

8. The method of measuring surface motion according to claim 7, wherein said step for each level further includes the step of estimating a position of a point corresponding to each of the measurement points of the level immediately above each said level, by interpolating a position of a point corresponding to each of the measurement points of each said level.

9. A computer readable medium, bearing a plurality of sequences of instructions, which, when executed by one or more processors, cause one or more processors to configure an apparatus for measuring surface motion of an object, said plurality of sequences of instructions including sequences of instructions, which, when executed by said one or more processors, cause said one or more processors to perform the steps of:

determining a plurality of measurement points in an image of said object of a first unit image, said plurality of measurement points having a hierarchical structure of a plurality of levels, with the higher level layer including measurement points larger in number than the lower level layer;

determining points in said object image of said second unit image, corresponding to the measurement points of said first unit image of the lowest level of the hierarchical structure of said plurality of levels; and repeating, starting from a level immediately upper than the lowest level to the highest level, determination of the points corresponding to the measurement points of the first unit image, of each level, in the image of said object of said second unit image, based on the points corresponding to said measurement points of said first unit image at an immediately lower level of each level in the image of said object of said second unit image.

10. The computer readable medium according to claim 9, wherein said step of determining measurement points includes the steps of determining a plurality of reference points of said object image of said first unit image, and determining, based on the plurality of reference points, arrangement of the measurement points having a predetermined distribution.

11. The computer readable medium according to claim 10, wherein said step of determining arrangement of the measurement points includes the step of mapping a plurality of points arranged at prescribed positions on a pre-selected prescribed three-dimensional plane in accordance with the three-dimensional shape of the object surface, to an image plane of said image, using the plurality of reference points as the reference.

12. The computer readable medium according to claim 11, further comprising the step of determining the three-dimensional position of said object by reverse-projecting, onto a prescribed three-dimensional plane, the points of the image of said object in the second unit image corresponding to said measurement points of said first unit image.

13. The computer readable medium according to claim 12, wherein said step of determining the points corresponding to said measurement points further includes the step of estimating position of each of the measurement points at the level immediately higher than said lowest level by interpolating position of the point corresponding to each of the measurement points at the lowest level.

14. The computer readable medium according to claim 13, wherein
    said step of repeating includes the steps of repeating, starting from the level immediately higher than the lowest level to the highest level one by one, the steps for each level, including the steps of
    regarding, for said first unit image, each of the points of which position is estimated for the level immediately lower than said each level as a measurement point of said each level,
    determining an image segment having a prescribed relation with the measurement points of each level, in the subband image corresponding to said each level, and
    determining, in said second unit image, a position of the point corresponding to each of the measurement points of each level of said first unit image, by determining the image segment of said subband image of the corresponding level obtained for said second unit image, that represents the highest correlation with the texture of each said image segment.

15. The computer readable medium according to claim 14, wherein
    said step for each level further includes the step of estimating a position of a point corresponding to each of the measurement points of the level immediately above each said level, by interpolating a position of a point corresponding to each of the measurement points of each said level.

16. The computer readable medium according to claim 11, wherein
    said step of determining the points corresponding to the measurement points includes the steps of
    obtaining subband images by wavelet transform, with a plurality of resolutions same in number as said plurality of levels, the object images of said first and second unit images, the plurality of resolutions being in correspondence with the plurality of levels and resolution corresponding to a lower level being selected to be lower;
    determining correspondence between the corresponding subband images of the lowest level and the measurement points of said lowest level, for said first unit image;
    determining image segments having a prescribed relation with each of the measurement points of said lowest level of said subband images of said lowest level obtained for said first unit image; and
    determining positions of points in said second unit image, corresponding to each of the measurement points of said lowest level in said first unit image, by determining an image segment of said subband image of said lowest level obtained for said second unit image that represents the highest correlation with the texture of each said image segment.

* * * * *